US009624413B2

(12) United States Patent
Fukushima

(10) Patent No.: US 9,624,413 B2
(45) Date of Patent: Apr. 18, 2017

(54) WORKING MEDIUM FOR HEAT PUMP, AND HEAT PUMP SYSTEM

(71) Applicant: ASAHI GLASS COMPANY, LIMITED, Tokyo (JP)

(72) Inventor: Masato Fukushima, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 14/816,192

(22) Filed: Aug. 3, 2015

(65) Prior Publication Data

US 2015/0337191 A1 Nov. 26, 2015

Related U.S. Application Data

(63) Continuation of application No. PCT/JP2014/052566, filed on Feb. 4, 2014.

(30) Foreign Application Priority Data

Feb. 5, 2013 (JP) ................................ 2013-020930

(51) Int. Cl.

*C09K 5/04* (2006.01)
*F25B 13/00* (2006.01)
*F25B 9/00* (2006.01)

(52) U.S. Cl.

CPC .............. *C09K 5/045* (2013.01); *F25B 9/006* (2013.01); *F25B 13/00* (2013.01); *C09K 2205/122* (2013.01); *C09K 2205/126* (2013.01); *C09K 2205/22* (2013.01)

(58) Field of Classification Search

CPC .......... C09K 2205/00; C09K 2205/122; C09K 2205/34; C09K 2205/22; C09K 5/04; C09K 5/044; C09K 5/045

USPC .............................................. 252/67, 68, 69

See application file for complete search history.

(56) References Cited

U.S. PATENT DOCUMENTS

2008/0314073 A1 12/2008 Minor
2010/0090156 A1 4/2010 Nappa et al.
2011/0258146 A1 10/2011 Low
2011/0258147 A1 10/2011 Low
2011/0260095 A1 10/2011 Low
2012/0168672 A1 7/2012 Nappa et al.
2014/0070132 A1* 3/2014 Fukushima ............. F25B 9/002 252/67
2015/0376486 A1* 12/2015 Hashimoto ............ C09K 5/045 252/67
2016/0075927 A1* 3/2016 Fukushima ............ C09K 5/045 252/68

FOREIGN PATENT DOCUMENTS

JP 2010-530952 9/2010
JP 2012-505296 3/2012
JP 2012-510550 5/2012
WO WO 2012/069725 5/2012
WO WO 2012/157764 11/2012

OTHER PUBLICATIONS

International Search Report issued May 13, 2014 in PCT/JP2014/052566 filed Feb. 4, 2014.

* cited by examiner

*Primary Examiner* — Douglas McGinty

(74) *Attorney, Agent, or Firm* — Oblon, McClelland, Maier & Neustadt, L.L.P.

(57) ABSTRACT

A working medium for a heat pump, including: 1,1,2-trifluoroethylene; at least one of 1,1,1,2-tetrafluoroethane and pentafluoroethane; and at least one of 2,3,3,3-tetrafluoropropene, 1,3,3,3-tetrafluoropropene, and 3,3,3-trifluoropropene.

20 Claims, 2 Drawing Sheets

WORKING MEDIUM FOR HEAT PUMP, AND HEAT PUMP SYSTEM

TECHNICAL FIELD

The present invention relates to a working medium, and a heat pump system employing the working medium.

BACKGROUND ART

As a working medium to be used for a heat pump system such as an air-conditioning system, a chlorofluorocarbon (CFC) such as chlorotrifluoromethane or dichlorodifluoromethane, or a hydrochlorofluorocarbon (HCFC) such as chlorodifluoromethane has been known. However, influences of CFCs and HCFCs over the ozone layer in the stratosphere have been pointed out, and their use is regulated at present.

As a working medium which has less influence over the ozone layer, a hydrofluorocarbon (HFC) such as difluoromethane, tetrafluoroethane or pentafluoroethane has been known. However, it has been pointed out that HFCs may cause global warming.

As a working medium which has less influence over the ozone layer and has less influence over global warming, a hydrofluoroolefin (HFO) having a carbon-carbon double bond which is likely to be decomposed by OH radicals in the air may be mentioned.

As a HFO with which excellent heat pump performance will be obtained, 1,1,2-trifluoroethylene (hereinafter referred to as "HFO-1123") may be mentioned. However, HFO-1123 is flammable. To suppress the flammability of HFO-1123, a working medium having a HFC such as pentafluoroethane (hereinafter referred to as "HFC-125") added to HFO-1123 has been proposed (Patent Document 1).

PRIOR ART DOCUMENT

Patent Document

Patent Document 1: WO2012/157764

DISCLOSURE OF INVENTION

Technical Problem

The present inventor has measured the critical temperature of HFO-1123 by a method of visually observing the position of extinction of the gas-liquid interface and coloring by critical opalescence, and found that the critical temperature of HFO-1123 is substantially lower than the critical temperature estimated from its boiling point.

Specifically, as a method of estimating the critical temperature of a medium from the boiling point of the medium, Joback method has been known. The critical temperature of HFO-1123 estimated from the boiling point (−51° C., 222.15K) by the Joback method is 75.86° C. (349.01K). Since the estimated critical temperature of HFO-1123 is about 76° C., the present inventor has predicted that the temperature of the working medium in a heat pump system in operation would not exceed the critical temperature and HFO-1123 could be a working medium stably exhibiting heat pump performance. However, the critical temperature of HFO-1123 actually measured was 59.2° C. Thus, it was found that a working medium consisting of HFO-1123 is in a critical state particularly in a working environment at a high ambient temperature and may not stably exhibit heat pump performance.

The object of the present invention is to provide a working medium for a heat pump, which has less influence over global warming, which has favorable flame retardancy as compared with a working medium consisting solely of HFO-1123, and with which a heat pump system stably exhibiting heat pump performance even at a higher working temperature is obtained, and a heat pump system employing the working medium for a heat pump.

Solution to Problem

In order to achieve the above objects, the present invention provides the following.

[1] A working medium for a heat pump, which comprises HFO-1123, at least one member selected from the group consisting of 1,1,1,2-tetrafluoroethane (hereinafter referred to as "HFC-134a") and HFC-125, and at least one member selected from the group consisting of 2,3,3,3-tetrafluoropropene (hereinafter referred to as "HFO-1234yf"), 1,3,3,3-tetrafluoropropene (hereinafter referred to as "HFO-1234ze") and 3,3,3-trifluoropropene (hereinafter referred to as "HFO-1243zf").

[2] The working medium for a heat pump according to [1], which satisfies conditions of the following formulae (1) to (3):

$$60 \leq a \leq 80 \quad (1)$$

$$b+c \geq 5 \quad (2)$$

$$a+b+c+d \geq 90 \quad (3)$$

wherein a is the content (mass %) of HFO-1123, b is the content (mass %) of HFC-134a, c is the content (mass %) of HFC-125, and d is the total content (mass %) of HFO-1234yf, HFO-1234ze and HFO-1243zf.

[3] The working medium for a heat pump according to [1] or [2], which satisfies a condition of the following formula (4):

$$14.3 \times b + 35 \times c < 500 \quad (4)$$

wherein b is the content (mass %) of 1,1,1,2-tetrafluoroehtane, and c is the content (mass %) of pentafluoroethane.

[4] The working medium for a heat pump according to any one of [1] to [3], wherein the total content of 1,1,1,2-tetrafluoroethane and pentafluoroethane is at most 35 mass %.

[5] The working medium for a heat pump according to any one of [1] to [4], wherein the total content of 1,1,1,2-tetrafluoroethane and pentafluoroethane is at most 20 mass %.

[6] The working medium for a heat pump according to any one of [1] to [5], wherein the total content of 2,3,3,3-tetrafluoropropene, 1,3,3,3-tetrafluoropropene and 3,3,3-trifluoropropene is at least 1 mass %.

[7] The working medium for a heat pump according to any one of [1] to [6], wherein the total content of 2,3,3,3-tetrafluoropropene, 1,3,3,3-tetrafluoropropene and 3,3,3-trifluoropropene is at most 35 mass %.

[8] The working medium for a heat pump according to any one of [1] to [7], wherein the total content of 2,3,3,3-tetrafluoropropene, 1,3,3,3-tetrafluoropropene and 3,3,3-trifluoropropene is from 5 to 35 mass %.

[9] A heat pump system employing the working medium for a heat pump as defined in any one of [1] to [8].

[10] The heat pump system according to [9], which is an air-conditioning system.

[11] The heat pump system according to [9], which is a refrigerating system.

Advantageous Effects of Invention

The working medium for a heat pump of the present invention has less influence over global warming, has favorable flame retardancy as compared with a working medium consisting solely of HFO-1123, and with the working medium, a heat pump system stably exhibiting heat pump performance even at a higher working temperature is obtained.

Further, the heat pump system of the present invention stably exhibits heat pump performance even at a higher working temperature.

DESCRIPTION OF EMBODIMENTS

Working Medium for Heat Pump

Figure 1:
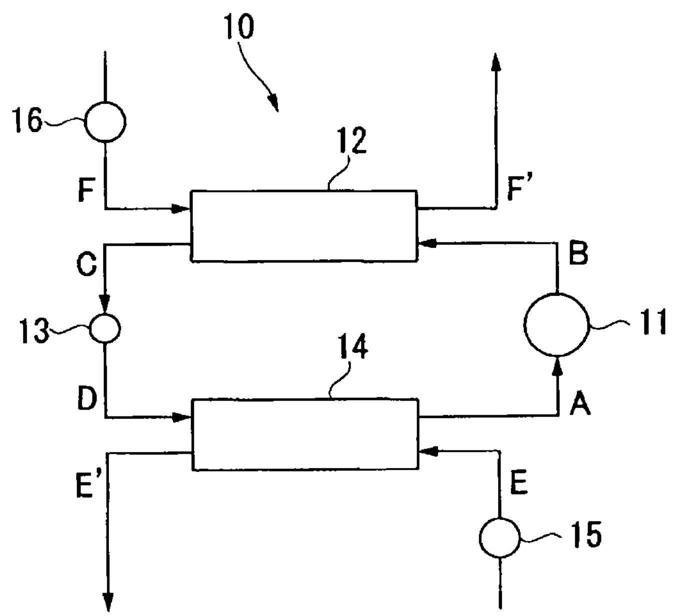
FIG. 1 is a schematic construction view illustrating an example of a heat pump system of the present invention.

The working medium for a heat pump of the present invention (hereinafter sometimes referred to simply as "a working medium") is a working medium to be used for a heat pump system, and comprises HFO-1123, at least one member selected from the group consisting of HFC-134a and HFC-125, and at least one member selected from the group consisting of HFO-1234yf, HFO-1234ze and HFO-1243zf. Hereinafter HFC-134a and HFC-125 will sometimes be collectively referred to as "a medium (α)". Further, HFO-1234yf, HFO-1234ze and HFO-1243zf will sometimes be collectively referred to as a medium (β).

The working medium of the present invention may contain, as the case requires, a medium other than HFO-1123, the medium (α) and the medium (β). [HFO-1123]

The boiling point of HFO-1123 is −51° C. (ASHRAE "CFCs: Time of Transition", (1989)), and the critical temperature is 59.2° C. (measured value).

HFO-1123 has a role to improve heat pump performance (cooling performance or heating performance) of a heat pump system employing the working medium of the present invention.

[Medium (α)]

HFC-134a and HFC-125 have a role to suppress flammability of HFO-1123. ANSI/ASHRAE Standard 34-2010 (Designation and Safety Classification of Refrigerants) classifies a medium into class 1: a flame retardant medium with no flame propagation observed at 60° C. under the atmospheric pressure, and into classes 2 and 3: a flammable medium with flame propagation observed. The classification into class 2 and class 3 is made based on the combustion lower limit concentration and the heat of combustion. Both HFC-134a and HFC-125 are classified into class 1.

Further, it is disclosed that flammability of difluoromethane (HFC-32) and 1,1,1-trifluoroethane (HFC-143a) which are classified into class 2 can be suppressed by addition of HFC-125 or HFC-134a. For example, R-410A (HFC-32/HFC-125 (mass ratio)=50/50), R-407A (HFC-32/HFC-125/HFC-134a (mass ratio)=20/40/40), R-407B (HFC-32/HFC-125/HFC-134a (mass ratio)=10/70/20), R-407C (HFC-32/HFC-125/HFC-134a (mass ratio)=23/25/52), R-407D (HFC-32/HFC-125/HFC-134a (mass ratio)=15/15/70), and R-407E (HFC-32/HFC-125/HFC-134a (mass ratio)=25/15/60) are classified into class 1. Further, R-507A (HFC-143a/HFC-125 (mass ratio)=50/50) and R-404A (HFC-143a/HFC-125/HFC-134a (mass ratio)=52/44/4) are also classified into class 1. As mentioned above, flammability can be suppressed by addition of HFC-125 or HFC-134a.

Of HFC-134a, the boiling point is −26.07° C. and the critical temperature is 100.93° C., and of HFC-125, the boiling point is −48.08° C. and the critical temperature is 66.02° C. (JSRAE Thermodynamic Table, Vol. 4 'HFO-1234ze(E)', (April 2011)).

[Medium (β)]

Of HFO-1234yf, the boiling point is −29.39° C. and the critical temperature is 94.70° C. (JSRAE Thermodynamic Table, Vol. 4 'HFO-1234ze(E)', (April 2011)).

Of HFO-1243zf, the boiling point is −25.45° C. and the critical temperature is 105.05° C. (Russian Patent No. 2073058).

HFO-1234ze may be trans-1,3,3,3-tetrafluoropropene (HFO-1234ze(E)) or may be cis-1,3,3,3-tetrafluoropropene (HFO-1234ze(Z)). Of HFO-1234ze(E), the boiling point is −18.96° C. and the critical temperature is 109.36° C. (JSRAE Thermodynamic Table, Vol. 4 'HFO-1234ze(E)', (April 2011)). Of cis-1,3,3,3-tetrafluoropropene (HFO-1234ze(Z)), the boiling point is −15.04° C. and the critical temperature is 154° C. (J. S. Brown, F. Polonara, G. D. Nicola, L. Fedele, S. Bobbo and C. Zilio: Proc. Int. Refrig. Air-Conditioning Conf., #2490, (2012)).

By mixing a certain medium with a medium having a critical temperature higher than the critical temperature of the certain medium, the critical temperature of the mixture of the media is increased depending upon the mixing ratio. The critical temperature of the medium (β) is higher than the critical temperature of HFO-1123, and by the medium (β), the working medium of the present invention is increased. Further, the medium (β) has less influence over global warming. Accordingly, by using the medium (β), the working medium exhibits stable heat pump performance while suppressing influence over global warming.

Although HFC-134a has an effect to increase the critical temperature of the working medium due to its critical temperature higher than that of HFO-1123, HFC-134a has a high global warming potential (GWP). Thus, HFC-134a alone cannot sufficiently increase the critical temperature of the working medium while suppressing influence over global warming.

[Another Medium]

As another medium, a HFO other than HFO-1123, HFO-1234yf, HFO-1234ze and HFO-1243zf, a HFC other than HFC-134a and HFC-125, a hydrocarbon, a hydrochlorofluoroolefin (HCFO) and a chlorofluoroolefin (CFO) may, for example, be mentioned.

Another HFO may be linear or branched. Such another HFO may, for example, be 1,2-difluoroethylene (HFO-1132), 2-fluoropropene (HFO-1261yf), 1,1,2-trifluoropropene (HFO-1243yc) or 1,2,3,3,3-pentafluoropropene (HFO-1225ye).

Such another HFO may be used alone or in combination of two or more.

Another HFC is preferably a HFC which has less influence over the ozone layer and which has less influence over global warming, and specifically preferably a $C_{1-5}$ HFC. Such another HFC may be linear, branched or cyclic.

Such another HFC may, for example, be difluoromethane, difluoroethane, trifluoroethane, tetrafluoroethane (excluding HFC-134a), pentafluoropropane, hexafluoropropane, heptafluoropropane, pentafluorobutane or heptafluorocyclopentane. Among them, another HFC is preferably difluoromethane (HFC-32), 1,1-difluoroethane (HFC-152a) or 1,1,2,2-tetrafluoroethane (HFC-134) which has less influence over the ozone layer and which has less influence over global warming.

Such another HFC may be used alone or in combination of two or more.

When the working medium of the present invention contains a hydrocarbon, solubility of a mineral lubricating oil in the working medium will be more favorable.

The hydrocarbon may, for example, be propane, propylene, cyclopropane, butane, isobutane, pentane or isopentane.

The hydrocarbon may be used alone or in combination of two or more.

When the working medium of the present invention contains a HCFO or a CFO, the flammability of the working medium will be more suppressed, and the solubility of a lubricating oil will be more favorable. The HCFO and the CFO are preferably a HCFO and a CFO which have less influence over the ozone layer and which have less influence over global warming.

The HCFO may, for example, be hydrochlorofluoropropene or hydrochlorofluoroethylene. The HCFO is preferably 1-chloro-2,3,3,3-tetrafluoropropene (HCFO-1224yd) or 1-chloro-1,2-difluoroethylene (HCFO-1122), which is more likely to suppress flammability of the working medium without significantly decreasing heat pump performance of the working medium of the present invention.

The HCFO may be used alone or in combination of two or more.

The CFO may, for example, be chlorofluoropropene or chlorofluoroethylene. The CFO is preferably 1,1-dichloro-2,3,3,3-tetrafluoropropene (CFO-1214ya) or 1,2-dichloro-1,2-difluoroethylene (CFO-1112) which is more likely to suppress flammability of the working medium without significantly decreasing heat pump performance of the working medium of the present invention.

The CFO may be used alone or in combination of two or more.

[Proportion of Media]

The working medium of the present invention preferably satisfies the following formulae (1) to (3):

$$60 \leq a \leq 80 \tag{1}$$

$$b+c \geq 5 \tag{2}$$

$$a+b+c+d \geq 90 \tag{3}$$

wherein a is the content (mass %) of HFO-1123, b is the content (mass %) of HFC-134a, c is the content (mass %) of HFC-125, and d is the total content (mass %) of HFO-1234yf, HFO-1234ze and HFO-1243zf.

The above formula (1) defines the content a of HFO-1123 in the working medium (100 mass %) of the present invention. By the working medium of the present invention satisfying the formula (1), a heat pump system with excellent heat pump performance will readily be obtained.

The lower limit of the content a of HFO-1123 is preferably 60 mass %, more preferably 65 mass %, whereby more excellent heat pump performance will be obtained. The upper limit of the content a of HFO-1123 is preferably 80 mass %, more preferably 75 mass %, whereby the flammability is more suppressed, and a heat pump system stably exhibiting heat pump performance will readily be obtained.

The above formula (2) defines the lower limit of the total content of HFC-134a and HFC-125 in the working medium (100 mass %) of the present invention. By the working medium of the present invention satisfying the above formula (2), a working medium having excellent flame retardancy will readily be obtained.

The lower limit of the total content of HFC-134a and HFC-125 in the working medium (100 mass %) of the present invention is preferably 5 mass %, more preferably 10 mass %, whereby a working medium excellent in the flame retardancy will readily be obtained.

The formula (3) defines the lower limit of the total content of HFO-1123, the medium (α) and the medium (β) in the working medium (100 mass %) of the present invention. By the working medium of the present invention satisfying the formula (3), flame retardancy is favorable as compared with HFO-1123 alone while suppressing influence over global warming, and a heat pump system stably exhibiting heat pump performance even at a higher working temperature will readily be obtained.

The lower limit of the total content of HFO-1123, the medium (α) and the medium (β) in the working medium (100 mass %) of the present invention is preferably 90 mass %. The upper limit of the total content of HFO-1123, the medium (α) and the medium (β) in the working medium (100 mass %) of the present invention is 100 mass %.

Further, the working medium of the present invention preferably satisfies the following formula (4):

$$14.3 \times b + 35 \times c < 500 \tag{4}$$

The formula (4) defines the upper limit of the total content of HFC-134a and HFC-125, in order that the global warming potential (GWP) by HFC-134a and HFC-125 contained in the working medium of the present invention is less than 500. GWP in the present invention means an accumulated radiant energy of a gas imposed on the globe over 100 years when 1 kg of the gas is emitted to the air, estimated as a proportion relative to carbon dioxide. GWP of HFC-134a is 1430, and GWP of HFC-125 is 3500.

By the working medium of the present invention satisfying the formula (4), influence over global warming can be particularly suppressed.

GWP of the medium (α) represented by 14.3×b+35×c is preferably less than 500, more preferably at most 300.

The upper limit of a content (b+c) of the medium (α) in the working medium (100 mass %) of the present invention is preferably 35 mass %, more preferably 30 mass %, further preferably 20 mass %.

When the medium (α) consists solely of HFC-134a, the content b of HFC-134a in the working medium (100 mass %) of the present invention is preferably from 5 to 34.5 mass %, more preferably from 5 to 20 mass %, further preferably from 5 to 10 mass %.

When the medium (α) consists solely of HFC-125, the content c of HFC-125 in the working medium (100 mass %)

of the present invention is preferably from 5 to 14 mass %, more preferably from 5 to 10 mass %, further preferably from 5 to 8 mass %.

When the medium (α) is a mixture of HFC-134a and HFC-125 in a mass ratio of 1:1, the total content of HFC-134a and HFC-125 in the working medium (100 mass %) of the present invention is preferably from 5 to 20 mass %, more preferably from 5 to 15 mass %, further preferably from 5 to 10 mass %.

The lower limit of the content (d) of the medium (β) in the working medium (100 mass %) of the present invention is preferably 1 mass %, more preferably 5 mass %, further preferably 10 mass %. The upper limit of the content (d) is preferably 35 mass %. Further, the content (d) is preferably from 15 to 35 mass %, more preferably from 20 to 30 mass %, further preferably from 25 to 30 mass %. When the content of the medium (β) is at least the lower limit, the critical temperature of the working medium will be higher, whereby a heat pump stably exhibiting heat pump performance will readily be obtained. When the content of the medium (β) is at most the upper limit, excellent flame retardancy and heat pump performance will readily be obtained.

The content of another medium in the working medium (100 mass %) of the present invention is preferably at most 10 mass %.

When the working medium of the present invention contains another medium, the content of another medium in the working medium (100 mass %) is preferably from 1 to 10 mass %, more preferably from 1 to 8 mass %, further preferably from 1 to 5 mass %.

Advantageous Effects

As described above, since the working medium of the present invention comprises HFO-1123, excellent heat pump performance is obtained, and since the working medium of the present invention comprises the medium (α), more favorable flame retardancy than HFO-1123 alone is obtained. Further, since the working medium of the present invention comprises the medium (β), it has a critical temperature higher than that of HFO-1123 alone, and a heat pump system stably exhibiting heat pump performance even at a higher working temperature is obtained. Further, since the working medium of the present invention comprises the medium (α) and the medium (β) in combination, it has less adverse effect over the ozone layer and global warming as compared with a case where only the medium (α) is added to HFO-1123.

[Lubricating Oil, Etc.]

In a heat pump system, the working medium of the present invention may be used as mixed with a lubricating oil. Further, the working medium of the present invention may contain known additives such as a stabilizer and a leak detecting substance.

(Lubricating Oil)

The lubricating oil may be a known lubricating oil used for a heat pump system.

The lubricating oil may, for example, be an oxygen-containing synthetic oil (such as an ester lubricating oil or an ether lubricating oil), a fluorinated lubricating oil, a mineral lubricating oil or a hydrocarbon synthetic oil.

The ester lubricating oil may, for example, be a dibasic acid ester oil, a polyol ester oil, a complex ester oil or a polyol carbonate oil.

The dibasic acid ester oil is preferably an ester of a $C_{5-10}$ dibasic acid (such as glutaric acid, adipic acid, pimelic acid, suberic acid, azelaic acid or sebacic acid) with a $C_{1-15}$ monohydric alcohol which is linear or has a branched alkyl group (such as methanol, ethanol, propanol, butanol, pentanol, hexanol, heptanol, octanol, nonanol, decanol, undecanol, dodecanol, tridecanol, tetradecanol or pentadecanol). Specifically, ditridecyl glutarate, di(2-ethylhexyl) adipate, diisodecyl adipate, ditridecyl adipate or di(3-ethylhexyl) sebacate may, for example, be mentioned.

The polyol ester oil is preferably an ester of a diol (such as ethylene glycol, 1,3-propanediol, propylene glycol, 1,4-butanediol, 1,2-butandiol, 1,5-pentadiol, neopentyl glycol, 1,7-heptanediol or 1,12-dodecanediol) or a polyol having from 3 to 20 hydroxy groups (such as trimethylolethane, trimethylolpropane, trimethylolbutane, pentaerythritol, glycerol, sorbitol, sorbitan or sorbitol/glycerin condensate) with a $C_{6-20}$ fatty acid (such as a linear or branched fatty acid such as hexanoic acid, heptanoic acid, octanoic acid, nonanoic acid, decanoic acid, undecanoic acid, dodecanoic acid, eicosanoic acid or oleic acid, or a so-called neo acid having a quaternary a carbon atom).

The polyol ester oil may have a free hydroxy group.

The polyol ester oil is preferably an ester (such as trimethylolpropane tripelargonate, pentaerythritol 2-ethylhexanoate or pentaerythritol tetrapelargonate) of a hindered alcohol (such as neopentyl glycol, trimethylolethane, trimethylolpropane, trimethylolbutane or pentaerythritol).

The complex ester oil is an ester of a fatty acid and a dibasic acid, with a monohydric alcohol and a polyol. The fatty acid, the dibasic acid, the monohydric alcohol and the polyol may be as defined above.

The polyol carbonate oil is an ester of carbonic acid with a polyol.

The polyol may be the above-described diol or the above-described polyol. Further, the polyol carbonate oil may be a ring-opening polymer of a cyclic alkylene carbonate.

The ether lubricating oil may be a polyvinyl ether oil or a polyoxyalkylene oil.

The polyvinyl ether oil may be one obtained by polymerizing a vinyl ether monomer such as an alkyl vinyl ether, or a copolymer obtained by copolymerizing a vinyl ether monomer and a hydrocarbon monomer having an olefinic double bond.

The vinyl ether monomer may be used alone or in combination of two or more.

The hydrocarbon monomer having an olefinic double bond may, for example, be ethylene, propylene, various forms of butene, various forms of pentene, various forms of hexene, various forms of heptene, various forms of octene, diisobutylene, triisobutylene, styrene, α-methylstyrene or alkyl-substituted styrene. The hydrocarbon monomer having an olefinic double bond may be used alone or in combination of two or more.

The polyvinyl ether copolymer may be either of a block copolymer and a random copolymer.

The polyvinyl ether may be used alone or in combination of two or more.

The polyoxyalkylene lubricating oil may, for example, be a polyoxyalkylene monool, a polyoxyalkylene polyol, an alkyl ether of a polyoxyalkylene monool or a polyoxyalkylene polyol, or an ester of a polyoxyalkylene monool or a polyoxyalkylene polyol. The polyoxyalkylene monool or the polyoxyalkylene polyol may be one obtained by e.g. a method of subjecting a $C_{2-4}$ alkylene oxide (such as ethylene oxide or propylene oxide) to ring-opening addition polymerization to an initiator such as water or a hydroxy group-containing compound in the presence of a catalyst such as an alkali hydroxide. Further, one molecule of the polyoxyalkylene chain may contain single oxyalkylene units or two or more types of oxyalkylene units. It is preferred that at least oxypropylene units are contained in one molecule.

The initiator may, for example, be water, a monohydric alcohol such as methanol or butanol, or a polyhydric alcohol such as ethylene glycol, propylene glycol, pentaerythritol or glycerol.

The polyoxyalkylene lubricating oil is preferably an alkyl ether or an ester of a polyoxyalkylene monool or polyoxyalkylene polyol. Further, the polyoxyalkylene polyol is preferably a polyoxyalkylene glycol. Particularly preferred is an alkyl ether of a polyoxyalkylene glycol having the terminal hydroxy group of the polyoxyalkylene glycol capped with an alkyl group such as a methyl group, which is called a polyglycol oil.

The fluorinated lubricating oil may, for example, be a compound having hydrogen atoms of a synthetic oil (such as the after-mentioned mineral oil, poly-α-olefin, alkylbenzene or alkylnaphthalene) substituted by fluorine atoms, a perfluoropolyether oil or a fluorinated silicone oil.

The mineral lubricating oil may, for example, be a naphthene mineral oil or a paraffin mineral oil obtained by purifying a lubricating oil fraction obtained by atmospheric distillation or vacuum distillation of crude oil by a purification treatment (such as solvent deasphalting, solvent extraction, hydrocracking, solvent dewaxing, catalytic dewaxing, hydrotreating or clay treatment) optionally in combination.

The hydrocarbon synthetic oil may, for example, be a poly-α-olefin, an alkylbenzene or an alkylnaphthalene.

The lubricating oil may be used alone or in combination of two or more.

The lubricating oil is preferably a polyol ester oil and/or a polyglycol oil in view of compatibility with the working medium for a heat pump, and is particularly preferably a polyalkylene glycol oil with a view to obtaining a remarkable antioxidant effect by the stabilizer.

The content of the lubricating oil is not limited within a range not to remarkably decrease the effects of the present invention, and is preferably from 10 to 100 parts by mass, more preferably from 20 to 50 parts by mass, based on 100 parts by mass of the working medium for a heat pump.

(Stabilizer)

The stabilizer is a component which improves the stability of the working medium against heat and oxidation.

The stabilizer may, for example, be an oxidation resistance-improving agent, a heat resistance-improving agent or a metal deactivator.

The oxidation resistance-improving agent and the heat resistance-improving agent may, for example, be N,N'-diphenylphenylenediamine, p-octyldiphenylamine, p,p'-dioctyldiphenylamine, N-phenyl-1-naphthyamine, N-phenyl-2-naphthylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol or 4,4'-methylenebis(2,6-di-t-butylphenol). Each of the oxidation resistance-improving agent and the heat resistance-improving agent may be used alone or in combination of two or more.

The metal deactivator may, for example, be imidazole, benzimidazole, 2-mercaptobenzothiazole, 2,5-dimercaptothiadiazole, salicylidene-propylenediamine, pyrazole, benzotriazole, tritriazole, 2-methylbenzamidazole, 3,5-dimethylpyrazole, methylenebis-benzotriazole, an organic acid or an ester thereof, a primary, secondary or tertiary aliphatic amine, an amine salt of an organic acid or inorganic acid, a heterocyclic nitrogen-containing compound, an amine salt of an alkyl phosphate, or a derivative thereof.

The amount of the stabilizer is not limited within a range not to remarkably decrease the effects of the present invention, and is preferably at most 5 parts by mass, more preferably at most 1 part by mass per 100 parts by mass of the working medium.

(Leak Detecting Substance)

The leak detecting substance may, for example, be an ultraviolet fluorescent dye, an odor gas or an odor masking agent.

The ultraviolet fluorescent dye may be known ultraviolet fluorescent dyes as disclosed in e.g. U.S. Pat. No. 4,249,412, JP-A-10-502737, JP-A-2007-511645, JP-A-2008-500437 and JP-A-2008-531836.

The odor masking agent may be known perfumes as disclosed in e.g. JP-A-2008-500437 and JP-A-2008-531836.

In a case where the leak detecting substance is used, a solubilizing agent which improves the solubility of the leak detecting substance in the working medium may be used.

The solubilizing agent may be ones as disclosed in e.g. JP-A-2007-511645, JP-A-2008-500437 and JP-A-2008-531836.

The amount of the leak detecting substance is not particularly limited within a range not to remarkably decrease the effects of the present invention, and is preferably at most 2 mass %, more preferably at most 0.5 mass % in the working medium (100 mass %).

<Heat Pump System>

The heat pump system of the present invention employs the working medium of the present invention. For the heat pump system of the present invention, a known embodiment may be employed except that the working medium of the present invention is employed.

FIG. 1 is a schematic construction view illustrating an example of a heat pump system of the present invention.

A heat pump system 10 is a system generally comprising a compressor 11 to compress a working medium vapor A to form a high temperature/high pressure working medium vapor B, a condenser 12 to cool and liquefy the working medium vapor B discharged from the compressor 11 to form a low temperature/high pressure working medium C, an expansion valve 13 to let the working medium C discharged from the condenser 12 expand to form a low temperature/low pressure working medium D, an evaporator 14 to heat the working medium D discharged from the expansion valve 13 to form a high temperature/low pressure working medium vapor A, a pump 15 to supply a load fluid E to the evaporator 14, and a pump 16 to supply a fluid F to the condenser 12.

In the heat pump system 10, the following cycle is repeated.

(i) A working medium vapor A discharged from an evaporator 14 is compressed by a compressor 11 to form a high temperature/high pressure working medium vapor B.

(ii) The working medium vapor B discharged from the compressor 11 is cooled and liquefied by a fluid F in a condenser 12 to form a low temperature/high pressure working medium C. At that time, the fluid F is heated to form a fluid F', which is discharged from the condenser 12.

(iii) The working medium C discharged from the condenser 12 is expanded in an expansion valve 13 to form a low temperature/low pressure working medium D.

(iv) The working medium D discharged from the expansion valve 13 is heated by a load fluid E in an evaporator 14 to form a high temperature/low pressure working medium vapor A. At that time, the load fluid E is cooled and becomes a load fluid E', which is discharged from the evaporator 14.

Figure 2:
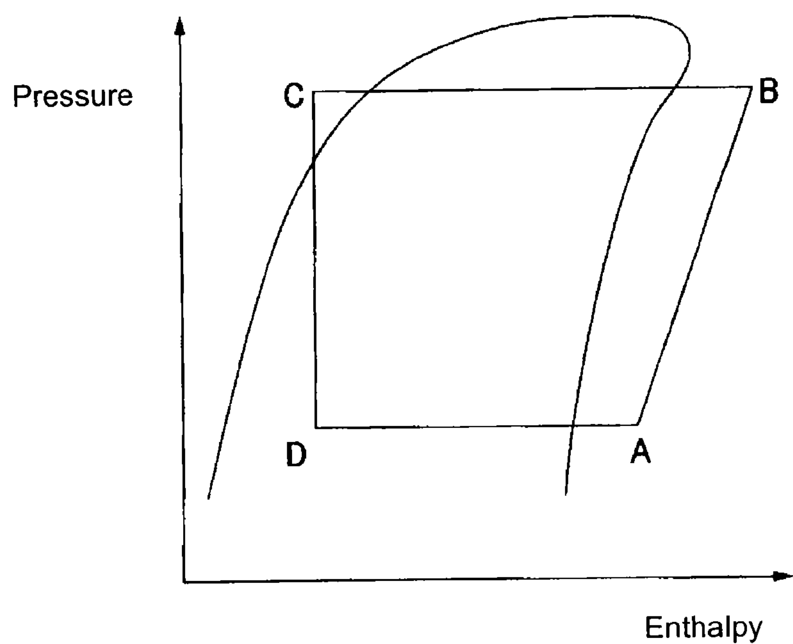
FIG. 2 is a cycle diagram illustrating the state change of a working medium in a heat pump system on a pressure-enthalpy chart.

The heat pump system 10 is a cycle system comprising an adiabatic isentropic change, an isenthalpic change and an isobaric change. The state change of the working medium may be shown as in FIG. 2, when it is represented on a pressure enthalpy chart.

The AB process is a process wherein adiabatic compression is carried out by the compressor 11 to change the high temperature/low pressure working medium vapor A to a high temperature/high pressure working medium vapor B. The BC process is a process wherein isobaric cooling is carried out in the condenser 12 to change the high temperature/high pressure working medium vapor B to a low temperature/high pressure working medium C. The CD process is a process wherein isenthalpic expansion is carried out by the expansion valve 13 to change the low temperature/high pressure working medium C to a low temperature/low pressure working medium D. The DA process is a process wherein isobaric heating is carried out in the evaporator 14 to have the low temperature/low pressure working medium D returned to a high temperature/low pressure working medium vapor A.

[Moisture Concentration]

If moisture is included in the heat pump system, a problem may occur particularly when the heat pump system is used at low temperature. For example, problems such as freezing in a capillary tube, hydrolysis of the working medium for Rankine cycle or the lubricating oil, deterioration of materials by an acid component formed in heat cycle, formation of contaminants, etc. may arise. Particularly, if the lubricating oil is a polyalkylene glycol oil or a polyol ester oil, it has extremely high moisture absorbing properties and is likely to undergo hydrolysis, and inclusion of moisture decreases properties of the lubricating oil and may be a great cause to impair the long term reliability of a compressor. Accordingly, in order to suppress hydrolysis of the lubricating oil, it is necessary to suppress the moisture concentration in the heat pump system.

As a method of suppressing the moisture concentration in the heat pump system, a method of using a desiccating agent (such as silica gel, activated aluminum or zeolite) may be mentioned. The desiccating agent is preferably brought into contact with the working medium in a liquid state, in view of the dehydration efficiency. For example, the desiccating agent is located at the outlet of the condenser 12 or at the inlet of the evaporator 14 to be brought into contact with the working medium.

The desiccating agent is preferably a zeolite desiccating agent in view of chemical reactivity of the desiccating agent and the working medium, and the moisture absorption capacity of the desiccating agent.

The zeolite desiccating agent is, in a case where a lubricating oil having a large moisture absorption as compared with a conventional mineral lubricating oil is used, preferably a zeolite desiccating agent containing a compound represented by the following formula (5) as the main component in view of excellent moisture absorption capacity.

$$M_{2/n}O.Al_2O_3.xSiO_2.yH_2O \quad (5)$$

wherein M is a group 1 element such as Na or K or a group 2 element such as Ca, n is the valence of M, and x and y are values determined by the crystal structure. The pore size can be adjusted by changing M.

To select the desiccating agent, the pore size and the fracture strength are important.

In a case where a desiccating agent having a pore size larger than the molecular size of the working medium is used, the working medium is adsorbed in the desiccating agent and as a result, chemical reaction between the working medium and the desiccating agent will occur, thus leading to undesired phenomena such as formation of non-condensing gas, a decrease in the strength of the desiccating agent, and a decrease in the adsorption capacity.

Accordingly, it is preferred to use as the desiccating agent a zeolite desiccating agent having a small pore size. Particularly preferred is sodium/potassium type A synthetic zeolite having a pore size of at most 3.5 Å. By using a sodium/potassium type A synthetic zeolite having a pore size smaller than the molecular size of the working medium, it is possible to selectively adsorb and remove only moisture in the heat cycle system without adsorbing the working medium. In other words, the working medium is less likely to be adsorbed in the desiccating agent, whereby heat decomposition is less likely to occur and as a result, deterioration of materials constituting the heat pump system and formation of contaminants can be suppressed.

The size of the zeolite desiccating agent is preferably from about 0.5 to about 5 mm, since if it is too small, a valve or a thin portion in pipelines of the heat pump system may be clogged, and if it is too large, the drying capacity will be decreased. Its shape is preferably granular or cylindrical.

The zeolite desiccating agent may be formed into an optional shape by solidifying powdery zeolite by a binding agent (such as bentonite). So long as the desiccating agent is composed mainly of the zeolite desiccating agent, other desiccating agent (such as silica gel or activated alumina) may be used in combination.

The proportion of the zeolite desiccating agent based on the working medium is not particularly limited.

[Non-Condensing Gas Concentration]

If non-condensing gas is included in the heat pump system, it has adverse effects such as heat transfer failure in the condenser or the evaporator and an increase in the working pressure, and it is necessary to suppress its inclusion as far as possible. Particularly, oxygen which is one of non-condensing gases reacts with the working medium or the lubricating oil and promotes their decomposition.

The non-condensing gas concentration is preferably at most 1.5 vol %, particularly preferably at most 0.5 vol % by the volume ratio based on the working medium, in a gaseous phase of the working medium.

The heat pump system may be one utilizing heat obtained by the condenser or may be one utilizing coldness obtained by the evaporator, and it may, for example, be an air-conditioning system or a refrigerating system. Particularly, the heat pump system of the present invention, which stably exhibits heat pump performance in a working environment at higher temperature, is preferably employed as an air-conditioning system to be disposed outdoors in many cases. Further, the heat pump system of the present invention is preferably employed also for a refrigerating system.

Specific examples of the air-conditioning system include a home room air-conditioner, a store package air-conditioner, a building package air-conditioner, a plant package air-conditioner, an industrial package air-conditioner, a train air-conditioning system and an automobile air-conditioning system.

Specific examples of the refrigerating system include a built-in showcase, a separate showcase, an industrial fridge freezer, a vending machine and an ice making machine.

Advantageous Effects

The above-described heat pump system of the present invention, which employs the working medium of the present invention, has less adverse effects on the ozone layer and global warming, and stably exhibits heat pump performance regardless of the working environment.

EXAMPLES

Now, the present invention will be described in further detail with reference to Examples. However, it should be understood that the present invention is by no means restricted to such specific Examples.

[Evaluation of Heat Pump Performance]

The refrigerating capacity Q and the coefficient of performance COP were evaluated as the heat pump performance when a working medium was applied to a heat pump system 10 in FIG. 1.

Evaluation was carried out in tests (A) to (H) setting the average evaporation temperature of the working medium in an evaporator 14, the average condensing temperature of the working medium in a condenser 12, the supercooling degree of the working medium in the condenser 12, and the degree of superheat of the working medium in the evaporator 14, as identified in Table 1. Further, it was assumed that there was not loss in the equipment efficiency and no pressure loss in the pipelines and heat exchanger.

TABLE 1

| | Average evaporation temperature [° C.] | Average condensing temperature [° C.] | Degree of superheat [° C.] | Supercooling degree [° C.] |
|---|---|---|---|---|
| Test (A) | −50 | 0 | 5 | 5 |
| Test (B) | −40 | 10 | 5 | 5 |
| Test (C) | −30 | 20 | 5 | 5 |
| Test (D) | −20 | 30 | 5 | 5 |
| Test (E) | −15 | 35 | 5 | 5 |
| Test (F) | −10 | 40 | 5 | 5 |
| Test (G) | −5 | 45 | 5 | 5 |
| Test (H) | 0 | 50 | 5 | 5 |

The refrigerating capacity Q and the coefficient of performance COP are obtained from the following formulae (6) and (7) using the enthalpy h in each state (provided that a suffix attached to h indicates the state of the working medium).

$$Q=h_A-h_D \quad (6)$$

$$COP=Q/\text{compression work}=(h_A-h_D)/(h_B-h_A) \quad (7)$$

The coefficient of performance COP means the efficiency in the heat pump system, and a higher coefficient of performance COP means that a higher output (refrigerating capacity Q) can be obtained by a smaller input (electric energy required to operate a compressor).

Further, the refrigerating capacity Q means a capacity to cool a load fluid, and a higher refrigerating capacity Q means that more works can be done in the same system. In other words, it means that with a working medium having a larger refrigerating capacity Q, the desired performance can be obtained with a smaller amount, whereby the system can be downsized.

The thermodynamic properties required for calculation of the heat pump performance were calculated based on the generalized equation of state (Soave-Redlich-Kwong equation) based on the law of corresponding state and various thermodynamic equations. If a characteristic value was not available, it was calculated employing an estimation technique based on a group contribution method.

Ex. 1 to 11

The refrigerating capacity Q and the coefficient of performance COP when each of the working media 1 to 11 having compositions as identified in Table 2 was applied to a heat pump system 10 in FIG. 1 were evaluated by the tests (A) to (H).

For evaluation, the relative refrigerating capacity (relative Q) obtained by dividing the refrigerating capacity Q of each of the working media 1 to 11 obtained under the respective test conditions by the refrigerating capacity Q of a working medium consisting solely of HFO-1123 under the same conditions was employed. Similarly, the relative coefficient of performance (relative COP) obtained by dividing the coefficient of performance COP of each of the working media 1 to 11 obtained under the respective test conditions by the coefficient of performance COP of a working medium consisting solely of HFO-1123 under the same conditions was employed. Further, in Ex. 1 to 11, the difference in temperature (DT) between initiation and completion of condensation of the working medium in a condenser 12 was obtained. The results are shown in Table 2.

Figure 3:
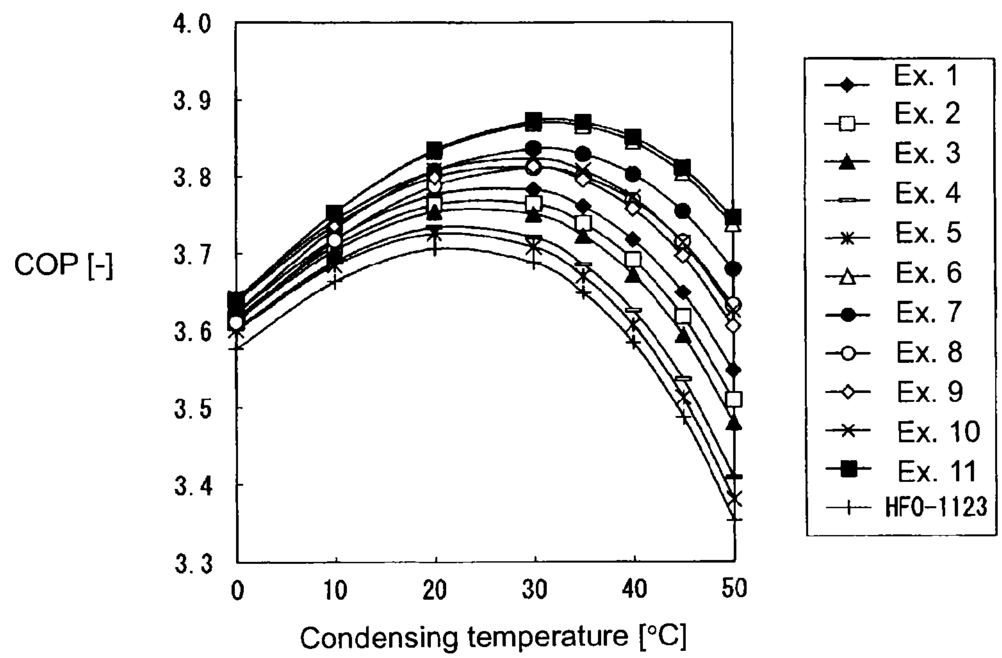
FIG. 3 is a graph showing the relation between the condensing temperature and the coefficient of performance COP of each of a working medium consisting solely of HFO-1123 and working media 1 to 11 in Ex. 1 to 11.
Figure 4:
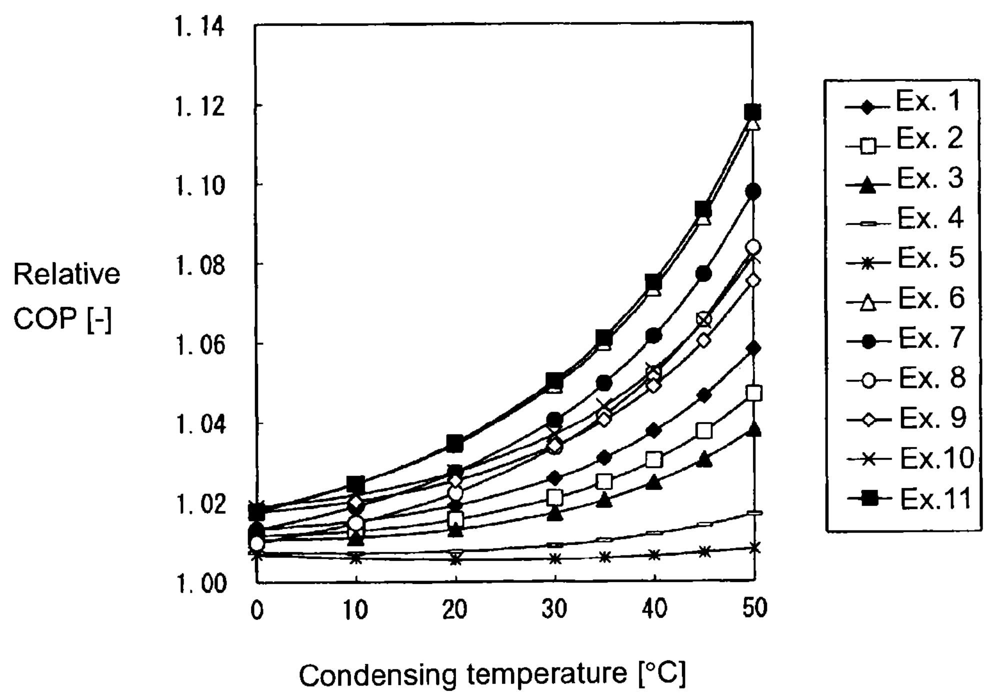
FIG. 4 is a graph illustrating the relation between the condensing temperature and the relative COP of each of working media 1 to 11 relative to the coefficient of performance COP of HFO-1123 alone.

Further, the relation between the condensing temperature in each of the tests (A) to (H) and the coefficient of performance COP of each of the working medium consisting solely of HFO-1123 and the working media in Ex. 1 to 11 is shown in FIG. 3. Further, the relation between the condensing temperature in each of the tests (A) to (H) and the relative COP of each of the working media 1 to 11 is shown in FIG. 4.

Ex. 12 to 53

The refrigerating capacity Q and the coefficient of performance COP when each of the working media 12 to 53 having compositions as identified in Tables 3 to 5 was applied to a heat pump system 10 in FIG. 1 were evaluated by the test (H).

For evaluation, the relative Q and the relative COP were employed in the same manner as in Ex. 1 to 11. Further, in Ex. 12 to 53, the difference in temperature (DT) between initiation and completion of condensation of the working medium in a condenser 12 was obtained. The results are shown in Tables 3 to 5.

TABLE 2

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Type of working medium | | 1 | 2 | 3 | 4 | 5 | 6 | 7 | 8 | 9 | 10 | 11 |
| HFO-1123 [mass %] | | 60 | 60 | 60 | 80 | 80 | 60 | 60 | 60 | 60 | 60 | 60 |
| Medium (α) | HFC-125 | 5 | 10 | 14 | 5 | 10 | 5 | 10 | 14 | — | — | — |
| [mass %] | HFC-134a | — | — | — | — | — | — | — | — | 5 | 10 | 34.5 |
| Medium (β) | HFO-1234yf | 35 | 30 | 26 | 15 | 10 | — | — | — | 35 | 30 | 5.5 |
| [mass %] | HFO-1234ze(E) | — | — | — | — | — | 35 | 30 | 26 | — | — | — |
| 14.3b + 35c | | 175.0 | 350.0 | 490.0 | 175.0 | 350.0 | 175.0 | 350.0 | 490.0 | 71.5 | 143.0 | 493.4 |
| b + c + d | | 40 | 40 | 40 | 20 | 20 | 40 | 40 | 40 | 40 | 40 | 40 |

TABLE 2-continued

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Test (A) | COP [—] | 3.62 | 3.62 | 3.61 | 3.60 | 3.60 | 3.64 | 3.62 | 3.61 | 3.64 | 3.64 | 3.64 |
| | Relative COP [—] | 1.01 | 1.01 | 1.01 | 1.01 | 1.01 | 1.02 | 1.01 | 1.01 | 1.02 | 1.02 | 1.02 |
| | Relative Q [—] | 0.72 | 0.75 | 0.77 | 0.89 | 0.91 | 0.61 | 0.64 | 0.66 | 0.70 | 0.70 | 0.64 |
| | DT [° C.] | 6.21 | 5.30 | 4.58 | 2.10 | 1.38 | 11.06 | 9.82 | 8.75 | 6.63 | 6.35 | 7.79 |
| Test (B) | COP [—] | 3.72 | 3.71 | 3.70 | 3.69 | 3.68 | 3.75 | 3.73 | 3.72 | 3.74 | 3.74 | 3.75 |
| | Relative COP [—] | 1.02 | 1.01 | 1.01 | 1.01 | 1.01 | 1.02 | 1.02 | 1.01 | 1.02 | 1.02 | 1.02 |
| | Relative Q [—] | 0.73 | 0.76 | 0.78 | 0.89 | 0.91 | 0.63 | 0.66 | 0.68 | 0.71 | 0.71 | 0.66 |
| | DT [° C.] | 6.04 | 5.15 | 4.45 | 2.07 | 1.37 | 10.68 | 9.44 | 8.39 | 6.45 | 6.17 | 7.43 |
| Test (C) | COP [—] | 3.78 | 3.76 | 3.75 | 3.73 | 3.73 | 3.83 | 3.81 | 3.79 | 3.80 | 3.81 | 3.83 |
| | Relative COP [—] | 1.02 | 1.02 | 1.01 | 1.01 | 1.01 | 1.03 | 1.03 | 1.02 | 1.03 | 1.03 | 1.03 |
| | Relative Q [—] | 1.74 | 0.76 | 0.78 | 0.89 | 0.91 | 0.65 | 0.68 | 0.70 | 0.72 | 0.72 | 0.68 |
| | DT [° C.] | 5.77 | 4.92 | 4.25 | 2.00 | 1.33 | 10.18 | 8.96 | 7.94 | 6.18 | 5.91 | 7.01 |
| Test (D) | COP [—] | 3.78 | 3.76 | 3.75 | 3.72 | 3.71 | 3.87 | 3.84 | 3.81 | 3.81 | 3.82 | 3.87 |
| | Relative COP [—] | 1.03 | 1.02 | 1.02 | 1.01 | 1.01 | 1.05 | 1.04 | 1.03 | 1.03 | 1.04 | 1.05 |
| | Relative Q [—] | 0.75 | 0.77 | 0.79 | 0.89 | 0.91 | 0.68 | 0.70 | 0.72 | 0.74 | 0.74 | 0.71 |
| | DT [° C.] | 5.39 | 4.58 | 3.96 | 1.86 | 1.25 | 9.53 | 8.35 | 7.36 | 5.79 | 5.53 | 6.49 |
| Test (E) | COP [—] | 3.76 | 3.74 | 3.72 | 3.69 | 3.67 | 3.87 | 3.83 | 3.80 | 3.80 | 3.81 | 3.87 |
| | Relative COP [—] | 1.03 | 1.02 | 1.02 | 1.01 | 1.01 | 1.06 | 1.05 | 1.04 | 1.04 | 1.04 | 1.06 |
| | Relative Q [—] | 0.76 | 0.78 | 0.79 | 0.89 | 0.91 | 0.69 | 0.71 | 0.73 | 0.74 | 0.74 | 0.72 |
| | DT [° C.] | 5.14 | 4.36 | 3.76 | 1.77 | 1.18 | 9.14 | 7.97 | 7.00 | 5.53 | 5.29 | 6.18 |
| Test (F) | COP [—] | 3.72 | 3.69 | 3.67 | 3.63 | 3.61 | 3.85 | 3.80 | 3.77 | 3.76 | 3.77 | 3.85 |
| | Relative COP [—] | 1.04 | 1.03 | 1.02 | 1.01 | 1.01 | 1.07 | 1.06 | 1.05 | 1.05 | 1.05 | 1.07 |
| | Relative Q [—] | 0.76 | 0.78 | 0.79 | 0.90 | 0.91 | 0.70 | 0.73 | 0.74 | 0.75 | 0.75 | 0.73 |
| | DT [° C.] | 4.84 | 4.10 | 3.52 | 1.65 | 1.10 | 8.69 | 4.10 | 6.60 | 5.23 | 5.01 | 5.84 |
| Test (G) | COP [—] | 3.65 | 3.62 | 3.59 | 3.54 | 3.51 | 3.80 | 3.75 | 3.71 | 3.70 | 3.71 | 3.81 |
| | Relative COP [—] | 1.05 | 1.04 | 1.03 | 1.01 | 1.01 | 1.09 | 1.08 | 1.07 | 1.06 | 1.06 | 1.09 |
| | Relative Q [—] | 0.77 | 0.79 | 0.80 | 0.90 | 0.91 | 0.72 | 0.74 | 0.76 | 0.76 | 0.76 | 0.75 |
| | DT [° C.] | 4.48 | 3.77 | 3.23 | 1.49 | 0.99 | 8.17 | 3.77 | 6.14 | 4.87 | 4.67 | 5.46 |
| Test (H) | COP [—] | 3.55 | 3.51 | 3.48 | 3.41 | 3.38 | 3.74 | 3.68 | 3.63 | 3.60 | 3.62 | 3.75 |
| | Relative COP [—] | 1.06 | 1.05 | 1.04 | 1.02 | 1.01 | 1.11 | 1.10 | 1.08 | 1.08 | 1.08 | 1.12 |
| | Relative Q [—] | 0.78 | 0.79 | 0.81 | 0.90 | 0.91 | 0.74 | 0.76 | 0.77 | 0.77 | 0.78 | 0.77 |
| | DT [° C.] | 4.04 | 3.37 | 2.87 | 1.29 | 0.85 | 7.57 | 6.48 | 5.59 | 4.43 | 4.25 | 5.02 |

TABLE 3

| | | Ex. 12 | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|---|---|---|---|---|---|
| HFO-1123 [mass %] | | 80 | 80 | 80 | 60 | 60 | 60 | 80 | 80 | 80 | 80 | 80 | 80 | 60 | 60 |
| Medium (α) [mass %] | HFC-125 | 5 | 10 | 14 | 5 | 10 | 14 | 5 | 10 | 14 | — | — | — | — | — |
| | HFC-134a | — | — | — | — | — | — | — | — | — | 5 | 10 | 19 | 5 | 20 |
| Medium (β) [mass %] | HFO-1234yf | — | — | — | — | — | — | — | — | — | 15 | 10 | 1 | — | — |
| | HFO-1234ze(E) | 15 | 10 | 6 | — | — | — | — | — | — | — | — | — | 35 | 20 |
| | HFO-1243zf | — | — | — | 35 | 30 | 26 | 15 | 10 | 6 | — | — | — | — | — |
| 14.3b + 35c | | 175.0 | 350.0 | 490.0 | 175.0 | 350.0 | 490.0 | 175.0 | 350.0 | 490.0 | 71.5 | 143.0 | 271.7 | 71.5 | 286.0 |
| b + c + d | | 20 | 20 | 20 | 40 | 40 | 40 | 20 | 20 | 20 | 20 | 20 | 20 | 40 | 40 |
| Test (H) | COP [—] | 3.49 | 3.44 | 3.39 | 3.63 | 3.58 | 3.54 | 3.44 | 3.40 | 3.37 | 3.47 | 3.50 | 3.55 | 3.78 | 3.77 |
| | Relative COP [—] | 1.04 | 1.03 | 1.01 | 1.08 | 1.07 | 1.06 | 1.03 | 1.01 | 1.00 | 1.03 | 1.04 | 1.06 | 1.13 | 1.13 |
| | Relative Q [—] | 0.88 | 0.90 | 0.92 | 0.80 | 0.81 | 0.82 | 0.91 | 0.92 | 0.93 | 0.89 | 0.89 | 0.89 | 0.73 | 0.75 |
| | DT [° C.] | 2.76 | 1.80 | 1.09 | 4.74 | 3.87 | 3.22 | 1.30 | 0.82 | 0.51 | 1.82 | 1.97 | 2.53 | 7.87 | 6.20 |

TABLE 4

| | | Ex. 26 | Ex. 27 | Ex. 28 | Ex. 29 | Ex. 30 | Ex. 31 | Ex. 32 | Ex. 33 | Ex. 34 | Ex. 35 | Ex. 36 | Ex. 37 | Ex. 38 | Ex. 39 |
|---|---|---|---|---|---|---|---|---|---|---|---|---|---|---|---|
| HFO-1123 [mass %] | | 60 | 80 | 80 | 80 | 60 | 60 | 60 | 80 | 80 | 80 | 60 | 60 | 60 | 80 |
| Medium (α) [mass %] | HFC-125 | — | — | — | — | — | — | — | — | — | — | 2.5 | 5 | 10 | 2.5 |
| | HFC-134a | 34.5 | 5 | 10 | 19 | 5 | 20 | 34 | 5 | 10 | 19 | 2.5 | 5 | 10 | 2.5 |

TABLE 4-continued

| | | Ex. 26 | Ex. 27 | Ex. 28 | Ex. 29 | Ex. 30 | Ex. 31 | Ex. 32 | Ex. 33 | Ex. 34 | Ex. 35 | Ex. 36 | Ex. 37 | Ex. 38 | Ex. 39 |
|---|---|---|---|---|---|---|---|---|---|---|---|---|---|---|---|
| Medium (β) [mass %] | HFO-1234yf | — | — | — | — | — | — | — | — | — | — | 35 | 30 | 20 | 15 |
| | HFO-1234ze(E) | 5.5 | 15 | 10 | 1 | — | — | — | — | — | — | — | — | — | — |
| | HFO-1243zf | — | — | — | — | 35 | 20 | 6 | 15 | 10 | 1 | — | — | — | — |
| 14.3b + 35c | | 493.4 | 71.5 | 143 | 271.7 | 71.5 | 286 | 486.2 | 71.5 | 143 | 271.7 | 123.3 | 246.5 | 493 | 123.3 |
| b + c + d | | 40 | 20 | 20 | 20 | 40 | 40 | 40 | 20 | 20 | 20 | 40 | 40 | 40 | 20 |
| Test (H) | COP [—] | 3.78 | 3.55 | 3.56 | 3.56 | 3.68 | 3.71 | 3.75 | 3.50 | 3.51 | 3.56 | 3.58 | 3.57 | 3.57 | 3.54 |
| | Relative COP [—] | 1.13 | 1.06 | 1.06 | 1.06 | 1.10 | 1.11 | 1.12 | 1.04 | 1.05 | 1.06 | 1.07 | 1.06 | 1.06 | 1.03 |
| | Relative Q [—] | 0.77 | 0.87 | 0.88 | 0.89 | 0.79 | 0.79 | 0.78 | 0.90 | 0.90 | 0.89 | 0.78 | 0.79 | 0.80 | 0.89 |
| | DT [° C.] | 5.53 | 3.32 | 2.96 | 2.63 | 5.12 | 4.44 | 5.00 | 1.85 | 1.96 | 2.52 | 4.24 | 3.83 | 3.28 | 1.56 |

TABLE 5

| | | Ex. 40 | Ex. 41 | Ex. 42 | Ex. 43 | Ex. 44 | Ex. 45 | Ex. 46 |
|---|---|---|---|---|---|---|---|---|
| HFO-1123 [mass %] | | 80 | 80 | 60 | 60 | 60 | 80 | 80 |
| Medium (α) [mass %] | HFC-125 | 5 | 9 | 2.5 | 5 | 10 | 2.5 | 5 |
| | HFC-134a | 5 | 9 | 2.5 | 5 | 10 | 2.5 | 5 |
| Medium (β) [mass %] | HFO-1234yf | 10 | 2 | — | — | — | — | — |
| | HFO-1234ze(E) | — | — | 35 | 30 | 20 | 15 | 10 |
| | HFO-1243zf | — | — | — | — | — | — | — |
| 14.3b + 35c | | 246.5 | 443.7 | 123.3 | 246.5 | 493 | 123.3 | 246.5 |
| b + c + d | | 20 | 20 | 40 | 40 | 40 | 20 | 20 |
| Test (H) | COP [—] | 3.44 | 3.46 | 3.76 | 3.73 | 3.68 | 3.52 | 3.50 |
| | Relative COP [—] | 1.03 | 1.03 | 1.12 | 1.11 | 1.10 | 1.05 | 1.04 |
| | Relative Q [—] | 0.90 | 0.91 | 0.74 | 0.75 | 0.78 | 0.87 | 0.89 |
| | DT [° C.] | 1.41 | 1.38 | 7.72 | 6.87 | 5.35 | 3.04 | 2.39 |

| | | Ex. 47 | Ex. 48 | Ex. 49 | Ex. 50 | Ex. 51 | Ex. 52 | Ex. 53 |
|---|---|---|---|---|---|---|---|---|
| HFO-1123 [mass %] | | 80 | 60 | 60 | 60 | 80 | 80 | 80 |
| Medium (α) [mass %] | HFC-125 | 9 | 2.5 | 5 | 10 | 2.5 | 5 | 9 |
| | HFC-134a | 9 | 2.5 | 5 | 10 | 2.5 | 5 | 9 |
| Medium (β) [mass %] | HFO-1234yf | — | — | — | — | — | — | — |
| | HFO-1234ze(E) | 2 | — | — | — | — | — | — |
| | HFO-1243zf | — | 35 | 30 | 20 | 15 | 10 | 2 |
| 14.3b + 35c | | 443.7 | 123.3 | 246.5 | 493 | 123.3 | 246.5 | 443.7 |
| b + c + d | | 20 | 40 | 40 | 40 | 20 | 20 | 20 |
| Test (H) | COP [—] | 3.47 | 3.66 | 3.64 | 3.61 | 3.47 | 3.46 | 3.46 |
| | Relative COP [—] | 1.03 | 1.09 | 1.09 | 1.08 | 1.03 | 1.03 | 1.03 |
| | Relative Q [—] | 0.91 | 0.79 | 0.80 | 0.82 | 0.91 | 0.91 | 0.91 |
| | DT [° C.] | 1.57 | 4.94 | 4.33 | 3.47 | 1.57 | 1.4 | 1.36 |

As shown in Table 2 and FIGS. 3 and 4, of the working media in Ex. 1 to 5 in which HFC-125 and HFO-1234yf were added to HFO-1123 in the proportion of the present invention, the relative COP exceeded 1 in the tests (A) to (H), and the higher the condensing temperature, the higher the relative COP. Further, the larger the amount of HFO-1234yf having a critical temperature higher than that of HFO-1123, the higher the relative COP. It was found from these results that with the working media in Ex. 1 to 5, the heat pump performance was exhibited more stably since the critical temperature of the working medium containing HFO-1234yf was higher than the critical temperature of HFO-1123, whereas with HFO-1123, the heat pump performance was lower as the condensing temperature was higher. Further, the working media in Ex. 1 to 5 had a sufficiently high relative Q, and sufficiently maintained the refrigerating capacity by HFO-1123. Further, in Ex. 1 to 5, DT was small, and a change in the composition which may inhibit cooling hardly occurred.

In Ex. 6 to 8 also in which HFC-125 and HFO-1234ze(E) were added to HFO-1123, in the same manner as in Ex. 1 to 3, the higher the condensing temperature, the higher the relative COP, and the larger the amount of HFO-1234yf having a critical temperature higher than that of HFO-1123, the higher the relative COP. Further, in Ex. 9 to 11 also in which HFC-134a and HFO-1234yf were added to HFO-1123, the higher the condensing temperature, the higher the relative COP. In Ex. 9 to 11, since the critical temperature of HFC-134a is also high, the same level of the relative COP was obtained also in a case where the proportion of HFC-134a was high as compared with HFO-1234yf, and the heat pump performance was stably exhibited.

Further, the working media in Ex. 6 to 11 had a sufficiently high relative Q, sufficiently maintained the refrigerating capacity by HFO-1123, had a small DT, and underwent substantially no change in the composition which may inhibit cooling.

Further, as shown in Tables 3 to 5, in Ex. 12 to 53 also in which at least one of HFC-125 and HFC-134a and at least one member selected from HFO-1234yf, HFO-1234ze(E) and HFO-1243zf were added to HFO-1123 in the proportion of the present invention, the relative COP was high in the test (H) in the same manner as in Ex. 1 to 11, and the heat pump performance was stably exhibited. Further, the working media in Ex. 12 to 53 had a sufficiently high relative Q, sufficiently maintained the refrigerating capacity by HFO-1123, had a small DT, and underwent substantially no change in the composition which may inhibit cooling.

As described above, in Ex. 1 to 53, the heat pump performance was stably exhibited in a state where GWP of the medium (α) was low and the adverse effect over global warming was minimized.

INDUSTRIAL APPLICABILITY

The working medium for a heat pump system of the present invention is useful as a working medium to be used for a heat pump system such as an air-conditioning system.

This application is a continuation of PCT Application No. PCT/JP2014/052566 filed on Feb. 4, 2014, which is based upon and claims the benefit of priority from Japanese Patent Application No. 2013-020930 filed on Feb. 5, 2013. The contents of those applications are incorporated herein by reference in their entireties.

REFERENCE SYMBOLS

10: heat pump system
11: compressor
12: condenser
13: expansion valve
14: evaporator
15: pump
16: pump

What is claimed is:

1. A working medium for a heat pump, comprising:
1,1,2-trifluoroethylene;
at least one of 1,1,1,2-tetrafluoroethane and pentafluoroethane; and
at least one of 2,3,3,3-tetrafluoropropene, 1,3,3,3-tetrafluoropropene, and 3,3,3-trifluoropropene.

2. The working medium of claim 1, which satisfies the formulae (1) to (3):

$$60 \leq a \leq 80 \quad (1)$$

$$b + c \geq 5 \quad (2)$$

$$a + b + c + d \geq 90 \quad (3)$$

wherein a is a content of 1,1,2-trifluoroethylene in mass %, b is a content of 1,1,1,2-tetrafluoroethane in mass %, c is a content of pentafluoroethane in mass %, and d is a total content of 2,3,3,3-tetrafluoropropene, 1,3,3,3-tetrafluoropropene, and 3,3,3-trifluoropropene in mass %.

3. The working medium of claim 1, which satisfies the formula (4):

$$14.3 \times b + 35 \times c < 500 \quad (4)$$

wherein b is a content of 1,1,1,2-tetrafluoroehtane in mass %, and c is a content of pentafluoroethane in mass %.

4. The working medium of claim 1, wherein a total content of 1,1,1,2-tetrafluoroethane and pentafluoroethane is at most 35 mass %.

5. The working medium of claim 1, wherein a total content of 1,1,1,2-tetrafluoroethane and pentafluoroethane is at most 20 mass %.

6. The working medium of claim 1, wherein a total content of 2,3,3,3-tetrafluoropropene, 1,3,3,3-tetrafluoropropene, and 3,3,3-trifluoropropene is at least 1 mass %.

7. The working medium of claim 1, wherein a total content of 2,3,3,3-tetrafluoropropene, 1,3,3,3-tetrafluoropropene, and 3,3,3-trifluoropropene is at most 35 mass %.

8. The working medium of claim 1, wherein a total content of 2,3,3,3-tetrafluoropropene, 1,3,3,3-tetrafluoropropene, and 3,3,3-trifluoropropene is from 5 to 35 mass %.

9. A heat pump system, comprising:
the working medium of claim 1.

10. The heat pump system of claim 9, which is an air-conditioning system.

11. The heat pump system of claim 9, which is a refrigerating system.

12. The working medium of claim 1,
wherein a content of 1,1,2-trifluoroethylene is from 60 to 80 mass %,
a total content of 1,1,1,2-tetrafluoroethane and pentafluoroethane is from 5 to 35 mass %, and
a total content of 2,3,3,3-tetrafluoropropene, 1,3,3,3-tetrafluoropropene, and 3,3,3-trifluoropropene is from 5 to 35 mass %.

13. The working medium of claim 3,
wherein a content of 1,1,2-trifluoroethylene is from 60 to 80 mass %,
a total content of 1,1,1,2-tetrafluoroethane and pentafluoroethane is from 5 to 35 mass %, and
a total content of 2,3,3,3-tetrafluoropropene, 1,3,3,3-tetrafluoropropene, and 3,3,3-trifluoropropene is from 5 to 35 mass %.

14. The working medium of claim 1, further comprising:
at least one hydrofluoroolefin selected from the group consisting of 1,2-difluoroethylene, 2-fluoropropene, 1,1,2-trifluoropropene, and 1,2,3,3,3-pentafluoropropene.

15. The working medium of claim 1, further comprising:
at least one hydrofluorocarbon selected from the group consisting of difluoromethane, difluoroethane, trifluoroethane, tetrafluoroethane other than 1,1,1,2-tetrafluoroethane, pentafluoropropane, hexafluoropropane, heptafluoropropane, pentafluorobutane, and heptafluorocyclopentane.

16. The working medium of claim 1, further comprising:
at least one hydrocarbon selected from the group consisting of propane, propylene, cyclopropane, butane, isobutane, pentane, and isopentane.

17. The working medium of claim 1, further comprising:
at least one hydrochlorofluoroolefin selected from the group consisting of 1-chloro-2,3,3,3-tetrafluoropropene and 1-chloro-1,2-difluoroethylene.

18. The working medium of claim 1, further comprising:
at least one chlorofluoroolefin selected from the group consisting of 1,1-dichloro-2,3,3,3-tetrafluoropropene and 1,2-dichloro-1,2-difluoroethylene.

19. The working medium of claim 1, wherein the working medium comprises 1,1,2-trifluoroethylene, pentafluoroethane, and 2,3,3,3-tetrafluoropropene.

20. The working medium of claim 1, wherein the working medium comprises 1,1,2-trifluoroethylene, 1,1,1,2-tetrafluoroethane, and 1,3,3,3-tetrafluoropropene.

* * * * *